United States Patent [19]
Tahon et al.

[11] Patent Number: 5,407,290
[45] Date of Patent: Apr. 18, 1995

[54] CONNECTING JOINT FOR ELECTRIC FURNACE ELECTRODES

[75] Inventors: Bernard Tahon; Philippe Beghein, both of Passy, France

[73] Assignee: Societe des Electrodes Et, Courbevoie, France

[21] Appl. No.: 72,954

[22] Filed: Jun. 8, 1993

[30] Foreign Application Priority Data

Jun. 18, 1992 [FR] France ............... 92 07990

[51] Int. Cl.6 ............................. F16B 7/00
[52] U.S. Cl. ............................. 403/298; 403/299; 252/511; 439/87; 524/6
[58] Field of Search ............ 403/298, 299; 439/87, 439/805; 252/511; 524/6

[56] References Cited

U.S. PATENT DOCUMENTS

| | | | |
|---|---|---|---|
| 1,040,830 | 10/1912 | Williamson | 439/805 |
| 2,810,117 | 10/1957 | Abbott | 439/87 |
| 3,140,967 | 7/1964 | Kaufmann et al. | |
| 3,322,446 | 5/1967 | Koziol et al. | |
| 4,430,469 | 2/1984 | Burge et al. | 524/6 |
| 4,624,984 | 11/1986 | Korb et al. | |
| 5,033,904 | 7/1991 | Challis | 403/298 |
| 5,233,012 | 8/1993 | Kawamura et al. | 524/6 |
| 5,292,792 | 3/1994 | Carew | 252/511 |

FOREIGN PATENT DOCUMENTS

| | | |
|---|---|---|
| 334007 | 4/1991 | European Pat. Off. |
| 260529 | 12/1991 | European Pat. Off. |
| 1380545 | 10/1964 | France |

*Primary Examiner*—John T. Kwon
*Attorney, Agent, or Firm*—Dennison, Meserole, Pollack & Scheiner

[57] ABSTRACT

A joint for rigidly and fixedly connecting in end-to-end relationship electrodes of graphite or carbon, whose ends comprise a socket with an internal screwthread into which is screwed a connector with a double screwthread or nipple which is pierced with holes acting as reservoirs containing a solid and electrically conductive cement characterised in that at least one of said reservoirs is filled with a synthetic cement formed by a thermosetting resin which in the presence of a catalyst melts at a temperature of higher than 60° C. to form a liquid phase of a viscosity of lower than 2500 centipoises at between 90° C. and 120° C. and polymerise at a temperature higher than or equal to 120° C.

10 Claims, 1 Drawing Sheet

CONNECTING JOINT FOR ELECTRIC FURNACE ELECTRODES

BACKGROUND OF THE INVENTION

Field of the Invention

The invention concerns a joint for rigidly and fixedly connecting in end-to-end relationship consummable electrodes of graphite or carbon which are used in electric furnaces.

Electrodes of carbon or graphite for electric furnaces, in particular arc furnaces, are consumed in use thereof and they are replaced as they are consumed by connecting a fresh portion of electrode to the preceding portion. At their ends such electrode portions comprise internally screwthreaded sleeves or sockets into which is screwed a connector with a conical double screwthread or nipple also made of graphite or carbon. The empty space between the adjacent threads of the nipple and the sockets is generally filled with a cement which is preferably a good conductor of electric current. That assembly constitutes the electrode joint which is therefore required to provide an effective and permanent mechanical and electrical connection between each portion of electrode.

In fact in the course of use that joint is subjected to numerous mechanical and thermal stresses which can give rise to incidents which are highly prejudicial to good operation of the furnace such as loosening and even rupture of the screwed socket/nipple assembly. Thus the joint must be capable of withstanding the mechanical shocks and vibration caused by short-circuiting of the electric arc or simply by some handling operations in procedures for charging a furnace and casting metal, but also the thermal stresses which in the course of use result in differential expansion of the carbonaceous elements constituting the joint. Those stresses may be amplified by the occurrence at the location of the nipple/socket of zones involving poor contact or even no contact and where the level of resistivity increases, locally causing overheating of the joint due to the Joule effect.

Significant amounts of progress have been achieved with the use of a joint for electrodes which systematically comprises as a filling material a cement based on carbonaceous products, the physico-chemical characteristics of which are adapted to the thermal cycle to which the joint is subjected in order to maintain an effective and permanent mechanical and electrical connection between each electrode portion. As regards filling of the gap between the screwthreads of the nipple and the socket with cement, one of the procedures which is most frequently employed involves introducing the carbonaceous cement which is solid at ambient temperature into openings provided in the nipple, acting as reservoirs. The carbonaceous cement which is a bonding agent based in most cases on pitch is deposited in the reservoirs of the nipple before assembly to the electrode sockets. The joint which is formed in that way between two portions of electrode is rapidly heated as it moves towards the molten bath, which causes softening and then flow of the cement in the reservoir to the spaces which have remained free between the nipple/socket screwthreads, where the cement hardens before being coked as from 400° C. and up to 800° C. to form a deposit which adheres to the surfaces of the screwthreads, thus providing a permanent mechanical and electrical connection.

There are a number of different configurations of joints of the reservoir type, which have been the subject of numerous patents, in particular U.S. Pat. Nos 2,510,230, 2,828,162 and 3,419,296. As regards to the cements which are the most widely used with that type of joint, these are bonding compositions based on pitch, incorporating organic bonding agents which are cokable but viscous at low temperature such as tar, pitch material, synthetic resin in accordance with U.S. Pat. No. 3,055,789 (French No 1 230 258) or such as dextrin, a thermo-setting synthetic resin in accordance with U.S. Pat. No. 3,624,011 (French No 1 485 912). Those bonding compositions make it possible on the one hand to regularise the sequence of distribution of the plastic pitch, the viscosity of which can vary between 100° C. and 200° C. in very substantial proportions and on the other hand to promote by virtue of the presence of a thermosetting resin solidification of the cement as from 200° or 300° C. In actual fact the presence of a thermosetting material already disturbs the flow of the cement and therefore good distribution thereof in the temperature range provided for that purpose, that is to say 100° to 200° C.

That problem of distribution seems to have been resolved by the use of new pitch-based compositions incorporating an additive agent intended to promote expansion of the cement upon heating and therefore to facilitate distribution thereof in the thread gap as from 100° C. Thus U.S. Pat. No. 3,976,496 (French No 2 204 673) recommends the use of a pasty cement of particulate pitch diluted in the bonding agent based on lignin sulphonate whose foaming properties after humidification and heating beyond 100° C. are known. Likewise EP-A-0 260 529 describes an electrode joint in which the cement is formed for the major part by pitch with the addition of a minor amount of a foaming agent selected from the group consisting of sulphur, 2,4-dinitroaniline, and nitrated clarified oils. In the latter case the foaming agent affords the double advantage of promoting distribution of the cement between the screwthreads, by considerably reducing the temperature at which softening of the pitch begins, and significantly increasing the rate of coking of the pitch as from 350° C.

On the other hand those types of joint are no longer suitable for electric furnace electrodes using the new procedures for protection from oxidation involving cooling the electrodes as much as possible, in particular by spraying water, and possibly depositing an anti-oxidising protective layer at the surface thereof by spraying an aqueous solution of a suitable salt, for example aluminium phosphate (EP-A-0 334 007) in the region between the electrode contact grippers and the closure of the furnace. In this case the heating cycle of the electrodes and consequently that of the joints is completely modified in such a way that the reservoir-type joints using the cements of the prior art as a filling material are no longer capable of correctly providing for an effective permanent mechanical and electrical connection between each electrode portion. More precisely, maintaining the electrodes for a prolonged period (from 5 to 10 hours) at temperatures of between 150° and 250° C., followed by a rapid rise to temperatures of higher than 500° C. as the electrode passes through the closure of the furnace do not make it possible, with just pitch-based cements, to achieve sufficiently rapid hardening before 500° C., so that the risks of loosening and an abnormal increase in the temperature of the joint become serious.

It has therefore been found necessary to develop a type of reservoir joint capable of providing a permanent and effect ire electrical and mechanical connection between electrodes which are cooled in use thereof and which are therefore subjected to a new thermal cycle, involving the use of a new cement which combines a large number of physico-chemical properties, namely:

stability in the solid state up to at least 60° C. to be preserved in the reservoirs of the nipple, irrespective of the period prior to use and the climatic conditions, fusion at between 90° C. and 120° C. with a reduction in viscosity to less than 2500 cP followed by rapid solidification with hardening at between 120° and 150° C., and finally good thermal stability to at least 400° C., being the beginning of coking, with the preservation of a fixed amount of carbon of at least 50%, ensuring a good mechanical and electrical connection for the junction, even after coking and up to 800° C.

SUMMARY OF THE INVENTION

Having regard to the difficulty and indeed the virtual impossibility involved in finding a new cement for a reservoir-type joint affording all of the physico-chemical characteristics required to withstand the stresses to which the joints are subjected in the course of the new thermal cycle for a cooled electrode, the inventors, after having experimented unsuccessfully with a cement produced by intimate mixing of a pitch-based cement of the prior art with a resin which is thermosetting at less than 200° C., developed a joint which contains separately in reservoirs provided in the nipple, on the one hand a pitch-based cement in accordance with the prior art, which is therefore capable of providing a satisfactory mechanical and electrical connection between each electrode portion beyond 400° C., and on the other hand a cement which is fusible and thermosetting at low temperature such as to meet the stresses imposed by the new thermal cycle from ambient temperature up to 500° C. Thus, such a mixed joint provides for effective glueing at any temperature up to about 800° C., being the temperature of the electrode in the proximity of the charge.

It is evident that, in the particular situations in which the maximum glueing temperature required does not exceed 500° C., it is advantageous to increase the number of reservoirs filled with the cement which is fusible and thermosetting at low temperature to the detriment of the reservoirs which are filled with the pitch-based cement, and indeed use only cement which is fusible and thermosetting at low temperature.

More precisely the invention concerns a joint for rigidly and fixedly connecting in end-to-end relationship electrodes of graphite or carbon, the ends of which comprise a socket with an internal screwthread into which is screwed a connector with a double screwthread or nipple, which is pierced with holes acting as reservoirs containing a solid and electrically conductive cement, characterised in that at least one of said reservoirs is filled with a synthetic cement formed by a thermosetting resin which, in the presence of a catalyst, melts at a temperature of higher than 60° C., to form a liquid phase of a viscosity of lower than 2500 centipoises between 90° and 120° C. and polymerise at a temperature higher than or equal to 120° C. Preferably the reservoirs are filled separately and alternatively with a pitch-based cement mixed with a foaming agent, and with said synthetic cement.

After numerous tests with carbonaceous glueing agents, the most suitable were found to be phenolic resins of low molecular weight, the melting point of which becomes higher than 60° C. after the addition of hexamine (hexanethylene tetramine $(CH_2)_6 N_4$) as a polymerisation catalyst in a proportion of from 1 to 20% and preferably from 8 to 12% of the weight of resin. That gives the best compromise between fluidity in the temperature range of from 90° C. to 120° C. where distribution of the glueing agent is to occur, and hardening by polymerisation in the temperature range of from 120° C. to 150° C. where hardening of the cement is to occur.

Thus, in the temperature range of from 90° to 120° C. for fusion of the mixture and preferably between 100° and 110° C., the viscosity must be lower than 2500 cP and preferably lower than 500 cP in order to provide a sufficient flow rate and distribution in respect of the catalysed resin placed in the reservoirs towards the free spaces between the nipple/socket screwthreads before hardening by polymerisation of the phenolic resin occurs as from 120° C. and up to 150° C. but preferably between 120° and 140° C. It is found on the one hand that the amount of catalyst obviously acts on the polymerisation rate but has practically no influence on the temperature at which polymerisation starts, while on the other hand, with additions of from 8 to 12% by weight of catalyst to the resin, the hardening rate is at a maximum, as is revealed by total polymerisation after only half an hour of heating at 130° C. It is noted finally that, in the temperature range of from 150° to 400° C. in which pitch-based cements are found to be generally ineffective, the level of stability of the polymerised phenolic resin is very high, unlike numerous other thermosetting carbon-based resins, as is revealed moreover by decomposition and coking temperatures which are close to 400° C. and a proportion of fixed carbon as monitored by thermogravimetry of higher than 55% and indeed even 60% under the optimum conditions in regard to the addition of from 8 to 12% of hexamine. Thus tests in regard to the effectiveness and stability of the glueing effect, which involve separating by means of a vice plates of graphite which are offset relative to each other but which are glued together in their contiguous portions by organic cement according to the invention containing 12% of hexamine heated at 130° C. for half an hour, showed that the plates were inseparable after heating successively at 140°–170°–200°–400° and 450° C., ungluing being achieved only at 500° C., the glueing becoming zero at 600° C.

DESCRIPTION OF THE INVENTION

Figure 1:
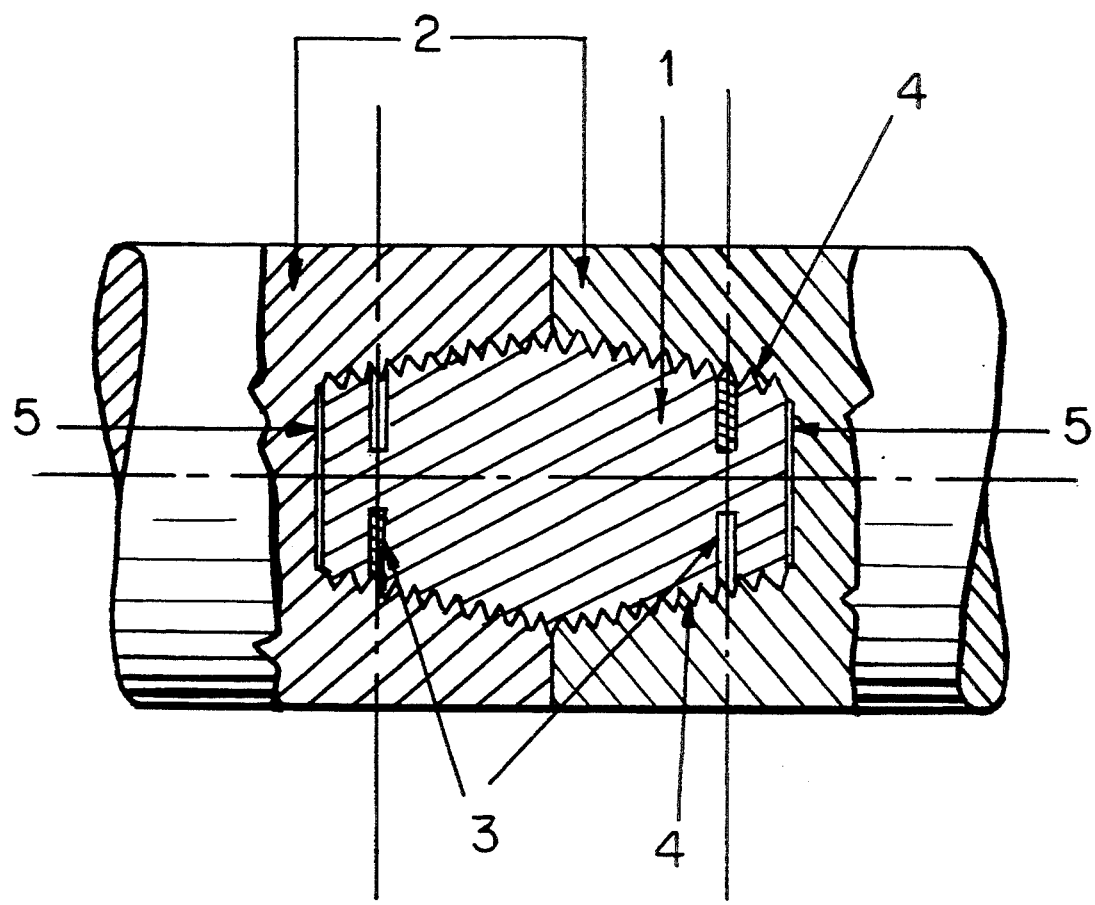
FIG. 1 is a longitudinal section of the joint for the present invention.

The invention will be better appreciated from the detailed description of the way in which it is carried into effect, with reference to FIG. 1 which is a view in longitudinal section of the joint in the plane passing through the axis of symmetry of the joint and through the axes of piercing of the blind holes acting as reservoirs.

The procedure comprises pre-mixing of the phenolic resin of low molecular weight with the hexamine catalyst in the powder state (granulometry 90% by weight smaller than 75 μm and at most 1% refusal at 150 μm) which is progressively introduced at a rate of 8 to 12% by weight of resin heated at a temperature of at least 90° C. but preferably not exceeding 110° C. The homogeneous liquid mixture, once made, is cooled and then cast in the form of small cylindrical rods or pellets which after solidification are placed in the reservoirs 3 of the nipple 1 shown in FIG. 1, in an alternate arrangement with small rods or pellets of cement of a known composition based on pitch mixed with sulphur (15 to 20% by weight). The reservoirs of which there are generally at least 4 are blind holes which are formed radially in the nipple along axes perpendicular to the axis of symmetry of the nipple in its frustoconical portions of smallest section in such a way that, at the moment of fusion, the liquid cement can not only be distributed by gravity into the spaces which have remained empty between the screwthreads 4, but also rise into the free spaces or clearances 5 which are provided voluntarily between the nipple and the sockets 2, that being due to an expansion effect in consequence of a small amount of gas being given off, as an accompaniment to the polymerisation reaction as from a temperature of 130° C.

As shown in FIG. 1 the blind holes are pierced two by two in oppositely facing relationship along the same axis, the piercing axes themselves being in the plane passing through the axis of symmetry of the joint. That preferred configuration may nonetheless be modified and comprise for example different piercing axes for each hole; said piercing axes, while remaining perpendicular to the axis of symmetry, may themselves be disposed in different planes.

As soon as it is brought into operation, by virtue of the connection of a new electrode, the joint is subjected to the thermal cycle performed by the cooled electrodes and accordingly it is raised fairly quickly (1 to 2 hours) to a temperature of between 150° and 250° C. in order then to be maintained in that temperature range for several hours before being again raised rapidly to more than 500° C. as it approaches the cover of the bath, and then 800° C. and indeed 900° C. in the proximity of the molten charge. That thermal cycle which is particular to cooled electrodes is performed without alteration in and therefore without failure of the mixed joint combining in accordance with the invention the use of a known pitch-based cement with a synthetic cement which is thermosetting at low temperature, the industrial performances of which are illustrated specifically by the series of the following examples of use concerning joints having nipples with reservoirs for the connection of graphite electrodes of a diameter of 600 mm for an arc furnace.

Example 1 (Prior art without cement)

The nipple-type joints are assembled without cement and subjected to a cold tightening torque of 1275 Nm.
    after heating at 140° C. for 1 hour, the torque required for release is 2304 Nm.
    after heating at 600° C. for 1 hour, the torque required for release is virtually zero.

Example 2 (Prior art with cement)

The nipple-type joints are assembled solely with cement based on pitch, mastic and sulphur of the prior art as described above and subjected to the same cold tightening torque of 1275 Nm of Example 1.
    after heating at 140° C. for 1 hour the torque required for release is 2470 Nm.
    after heating at 600° C. for 1 hour the torque required for release is higher than 6180 Nm, that is to say, higher than the options available at the test bench.

Example 3

The nipple-type joints are assembled solely with synthetic cement based on phenolic resin R 333$^{(R)}$ of low molecular weight, which is marketed by BORDEN, which is mixed after melting at 90° C. with 2% by weight of hexamine to form a cement which melts at 65° C., of which the viscosity at 110° C. is lower than 2000 centipoises and the fixed carbonaceous residue of the order of 56%, polymerising as from 130° C.
    cold tightening torque 1275 Nm, which is identical to Examples 1 and 2.
    after heating at 140° C. for 1 hour, the torque required for release is 5280 Nm.
    after heating at 600° C. for 1 hour, the release torque is 1465 Nm.

Example 4

The conditions of Example 3 are reproduced, but with a synthetic cement produced by the addition to phenolic resin R 333$^{(R)}$ of 9% by weight of hexamine to obtain after melting at 90° C. a cement which melts at 70° C. and of which the viscosity at 110° C. is lower than 500 cP and the fixed carbonaceous residue of the order of 60%, polymerising as from 130° C.
    cold tightening torque 1275 Nm, which is identical to the previous Examples.
    after heating at 140° C. for 1 hour, the torque required for release is higher than 6180 Nm, that is to say higher than the options afforded by the bench.
    after heating at 600° C. for 1 hour, the release torque is 1650 Nm.

Example 5

The conditions of Example 3 are repeated, but with a synthetic cement produced by the addition to phenolic resin R 333$^{(R)}$ of 12% by weight of hexamine to produce after melting at 90° C. a cement which melts at 75° C., of which the viscosity at 110° C. is lower than 250 cP and the carbonaceous residue is higher than 60%, polymerising as from a temperature of 130° C.
    cold tightening torque 1275 Nm, identical to the preceding Examples.
    after heating at 140° C. for 1 hour, the torque required for release is higher than 6180 Nm, that is to say, higher than the options available at the bench.
    after heating at 600° C. for 1 hour, the release torque is 1765 Nm.

Example 6

The optimum conditions of operation of the mixed joint according to the invention are reproduced, whereby two diagonally opposite reservoirs in FIG. 1 are filled with synthetic cement in the form of small rods or pellets, prepared in accordance with the conditions of Example 5 (addition of 12% of hexamine), while the other two diagonally opposite reservoirs are filled with the cement comprising pitch, mastic and sulphur, in accordance with Example 2 which is representative of the prior art.
    cold tightening torque 1275 Nm, identical to the preceding Examples.

after heating at 140° C. for 1 hour, the torque required for release is higher than 6180 Nm, that is to say higher than the options available at the bench.

after heating at 600° C. for 1 hour, the torque required for release is higher than 6180 Nm, that is to say higher than the options available at the bench.

It will be clear from this series of Examples that the glueing effect produced with synthetic cement containing from 8 to 12% of hexamine is the most effective at low temperature, as from 140° C., as polymerisation is very quick and the combination of that synthetic cement with pitch-based cement in accordance with the prior art makes it possible to produce a joint which is mechanically and electrically effective throughout the whole of the thermal cycle to which the cooled electrodes are subjected. It is finally to be noted that, beyond 15% by weight, the additions of hexamine lose their effectiveness as, from 20%, it is found that there is a degradation in terms of the characteristics of the cement, for example a reduction in the torques for release at low temperature.

It is claimed:

1. A joint for rigidly and fixedly connecting in end-to-end relationship electrodes of graphite or carbon, whose ends comprise an internal screwthreaded socket with a nipple pierced with holes acting as reservoirs containing a solid and electrically conductive cement characterised in that said reservoirs comprising first and second reservoirs, each of said first reservoirs being completely filled with a pitch-based cement containing a foaming agent, each of said second reservoirs being completely filled with cement containing a thermosetting resin, wherein in the presence of a catalyst, melts at a temperature of higher than 60° C. to form a liquid phase of a viscosity of lower than 2500 centipoises at between 90° C. and 120° C. and polymerise at a temperature of higher than or equal to 120° C.

2. A joint according to claim 1 characterised in that said pitch-based cement containing sulfur as the foaming agent, comprises said pitch-based cement selected from the group comprising pitch, and pitch with mastic.

3. A joint according to claim 1 characterised in that the thermosetting resin of the synthetic cement is a phenolic resin and the catalyst is hexamine or hexamethylenetetramine $(CH_2)_6N_4$.

4. A joint according to claim 3 characterised in that the percentage by weight of hexamine added to the phenolic resin is between 1 and 20%.

5. A joint according to claim 3 characterised in that the percentage by weight of hexamine added to the phenolic resin is between 8 and 12%.

6. A joint according to claim 1 characterised in that the viscosity of the synthetic cement is lower than 500 centipoises between 100° and 110° C.

7. A joint according to claim 1 characterised in that the polymerisation temperature of the synthetic cement is between 120° and 140° C.

8. A joint according to claim 3 characterised in that the synthetic cement has a proportion of fixed carbon of greater than 55% by weight.

9. A joint according to claim 1 wherein said nipple including frustoconical portions, said nipple being further formed with a plurality of reservoirs, each reservoir defined by a blind opening in the nipple, each of said reservoirs positioned on an axis perpendicular to a longitudinal axis of the nipple.

10. A joint according to claim 9, wherein said openings are filled alternately with said pitch-based cement and synthetic cement formed of small rods.

* * * * *